United States Patent [19]
Baldini

[11] Patent Number: 5,946,754
[45] Date of Patent: Sep. 7, 1999

[54] PEDAL ANCHORING CLEATS ON A SOLE OF A CYCLING SHOE

[75] Inventor: Piergiovanni Baldini, Massa Carrara, Italy

[73] Assignee: Calzaturificio Piva S.r.l., Pederobba, Italy

[21] Appl. No.: 09/069,180

[22] Filed: Apr. 29, 1998

[30] Foreign Application Priority Data

May 6, 1997 [IT] Italy .................................. PD97A0100

[51] Int. Cl.[6] .......................................................... A43D 5/00
[52] U.S. Cl. ............................................................... 12/123
[58] Field of Search ........................................ 12/123, 122

[56] References Cited

U.S. PATENT DOCUMENTS 610,363    9/1898  Muller .
2,011,437  8/1935  Crocella .
2,330,989  10/1943 Nevills .
3,671,989  6/1972  Deryck .

*Primary Examiner*—Ted Kavanaugh
*Attorney, Agent, or Firm*—Guido Modiano; Albert Josif

[57] ABSTRACT

A fixture for positioning pedal anchoring cleats on soles of cycling shoes comprising a support with at least two portions, a corresponding resting element being adjustably associated with each portion and having at least two pins for the self-centering support of the edge of an end of a corresponding shoe, the other end being supported by an opposite support. A corresponding element, simulating a bicycle pedal, is fixed to a support between the portions so as to correspond, during operation, to the region for the normal anchoring of the sole to the pedal. Means for simulating the bulk of the corresponding pedal crank of the bicycle are also provided.

10 Claims, 2 Drawing Sheets

5,946,754

PEDAL ANCHORING CLEATS ON A SOLE OF A CYCLING SHOE

BACKGROUND OF THE INVENTION

The present invention relates to a fixture for positioning pedal anchoring cleats on soles of cycling shoes.

Cycling requires the shoes worn by the athlete to be optimally anchored to the pedals of the bicycle.

The effective transmission of the athlete's force to the pedal and the reduction of risks of slippage or in any case of relative motion between the foot and the pedal, which clearly entail energy dissipation and even dangerous accidents, depend on the anchoring of the shoe to the pedal.

Initially, the shoe used to be anchored to the pedal by means of laces which were appropriately fixed to said pedal and, as a whole, formed a harness for the front part of the shoe.

Fastening and adjustment were then performed by means of a buckle which could be arranged in a position above the action of the athlete.

However, this system for mutually connecting the shoe and the pedal, although being extensively tested, was not free from drawbacks, particularly in relation to the possibility to adapt to the various body shapes of the athlete and to a certain difficulty in adjustment, especially during travel.

In order to obviate these drawbacks, cleats are currently universally used which, associated with anchoring means provided on the pedal, quickly and easily lock the shoe, and therefore the foot, to the pedal.

Said cleats are of course shaped so as to allow a certain adjustment of their position, so that each athlete can adapt the relative position of the shoe and of the pedal according to his individual body shape and physical characteristics, thus achieving optimum transfer of the force applied to the pedal and therefore of bicycle propulsion as a whole.

In normal cycling practice an athlete gradually refines, over time, his awareness of his individual optimum position with respect to the pedal; however, whenever it is necessary to replace the shoe, due to wear or breakage, the problem of positioning the cleat reoccurs.

Indeed, many cyclists prefer to purchase always the same type of shoe in order to achieve as quickly as possible an optimum adjustment of the position of the shoe with respect to the pedal.

However, it is evident that this practice is rather constraining; further, even if the same shoe type is to be preferred, the time inevitably comes when the model of said shoe is replaced by new models which perhaps have different contours and therefore the need arises again to find the optimum positioning of the cleat.

The problem of positioning the shoe and therefore the cleat with respect to the pedal is currently solved substantially with a long trial and error process.

Obviously, such a trial and error process, besides being long and work-intensive, often no longer provides the optimum results that had perhaps been achieved previously.

Unsuccessful attempts also cause imbalances which easily cause tendon inflammations which cause severe impairment to athletes.

SUMMARY OF THE INVENTION

The aim of the present invention is to provide a fixture which allows efficient, functional and quick positioning of the cleat, and of the shoe, with respect to the pedal.

Within the scope of this aim, an object of the present invention is to provide a fixture which is substantially universal and adaptable to any type of shoe, pedal and cleat currently commercially available.

Another object of the present invention is to provide a fixture which can be used easily even by users having no particular technical expertise.

Another object of the present invention is to provide a fixture which has a low cost, is particularly precise and is suitable to simultaneously position both shoes.

Another object of the present invention is to provide a fixture which can be manufactured with conventional technologies and is optionally also suitable to provide positioning in the presence of additional shims.

This aim, these objects and others which will become apparent hereinafter are achieved by a fixture for positioning pedal anchoring cleats on soles of cycling shoes, characterized in that it comprises a support with at least two portions, a corresponding resting element being adjustably associated with each one of said portions, said resting element having at least two pins for a self-centering support of the edge of an end of a corresponding shoe, the other end being supported by the opposite support, a corresponding element which simulates a bicycle pedal being fixed to said support between said portions so as to correspond, during operation, to a region for the normal anchoring of the sole to the pedal, means for simulating the bulk of the corresponding pedal crank of the bicycle being provided.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein.

DESCRIPTION OF THE PREFERRED EMBODIMENTS

Figure 1:
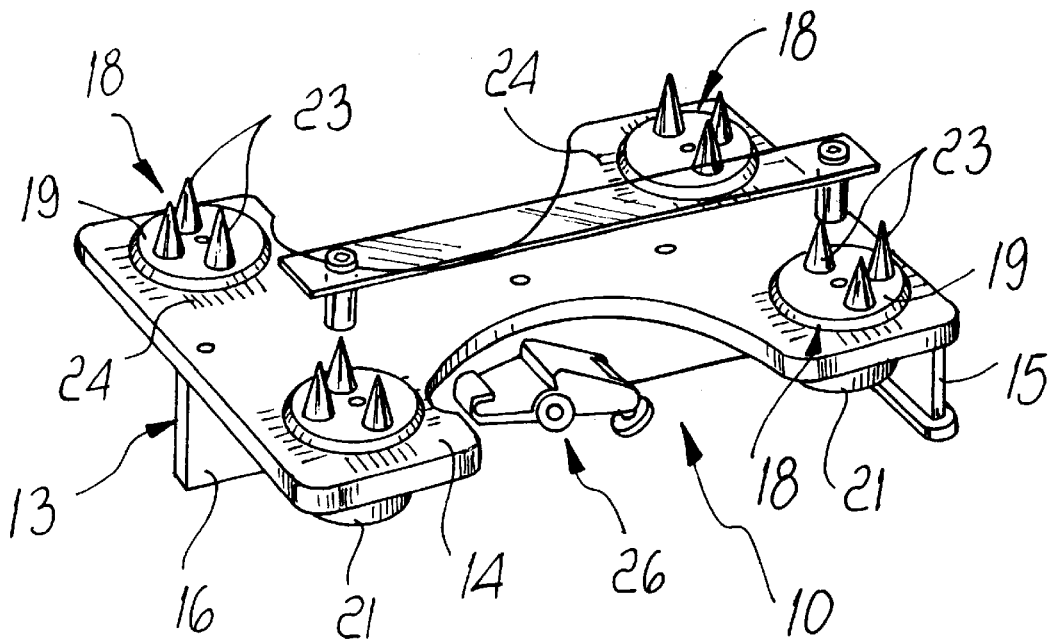
FIG. 1 is a perspective view of a fixture according to the present invention.
Figure 2:
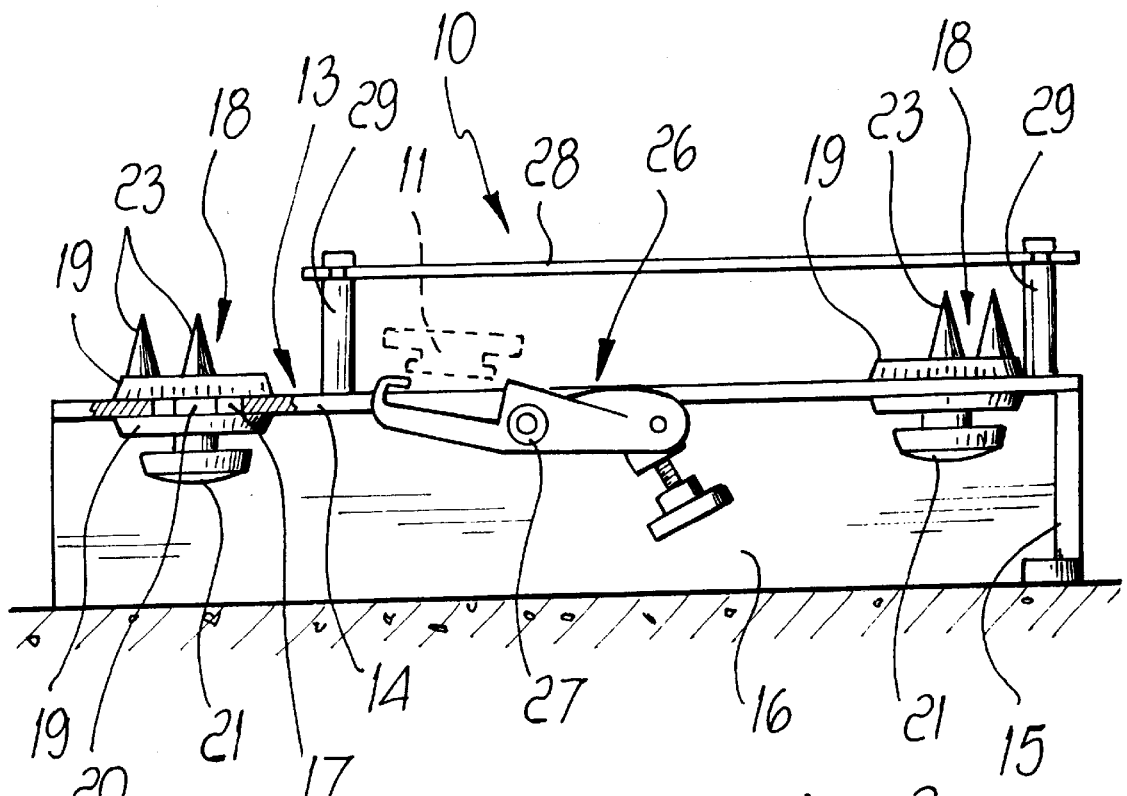
FIG. 2 is a lateral view of the fixture of FIG. 1.
Figure 3:
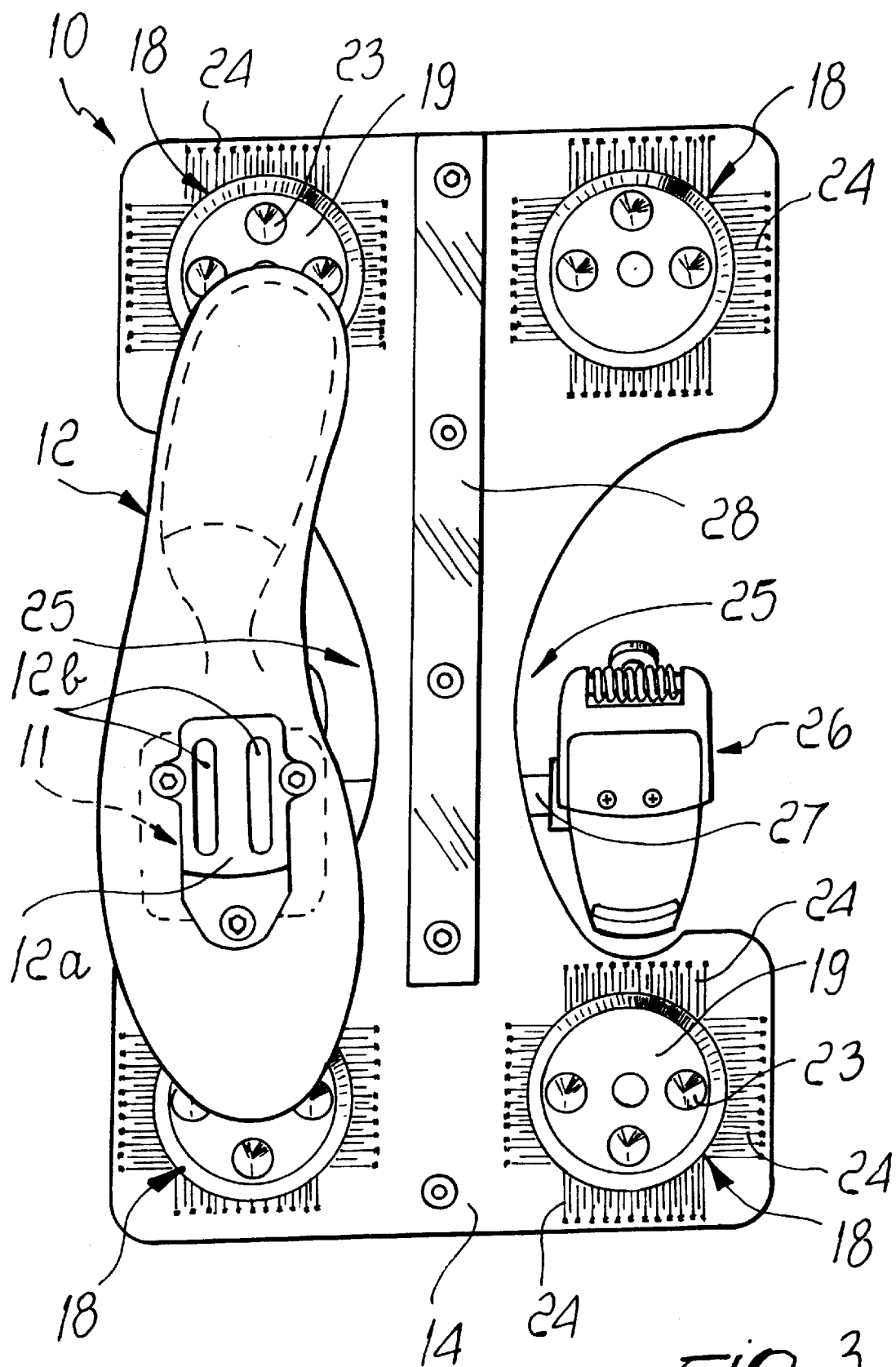
FIG. 3 is a plan view, during operation, of the fixture of FIG. 1.

With particular reference to FIGS. 1 to 3, a fixture particularly for positioning pedal anchoring cleats in a sole of cycling shoes, according to the invention, is generally designated by the reference numeral 10.

In particular, in the figures the reference numeral 12 generally designates a shoe subjected to positioning of the cleat, which is shown in dashed lines and designated by the reference numeral 11, while the reference numeral 12a designates a plate whereto the cleat 11 is coupled and the reference numeral 12b designates slotted holes for the fixing screws.

The fixture 10 comprises a support 13 which has a resting surface 14 and ground resting means which are constituted by two longitudinal strips, mutually arranged in a T-shaped configuration and designated by the reference numerals 15 and 16 respectively.

In particular, the supporting surface 14 has, in corresponding portions, two pairs of holes 17 which are arranged symmetrically.

A corresponding resting element, generally designated by the reference numeral 18, is adjustably associated on each one of the holes 17.

Each one of the resting elements 18, in this case, is constituted by two flat disks 19 which are axially associated with a threaded element 20 provided with a knob 21 which is available to the user's action; the flat disks are suitable to be adjustably fixed themselves, in a sandwich-like configuration, on the resting surface 14.

At least two but preferably three conical pins 23 protrude from one of the two flat disks 19 in the normal upper active configuration; the axes of the pins 23 are arranged like the vertices of an imaginary triangle, and the pins are provided for the self-centering support of one end of the corresponding shoe 12; the other end is supported by the opposite resting surface 18.

The diameter of each hole 17 is larger than the diameter of the threaded element 20, so that the resting elements 18 can have a wide range of movement.

The resting surface 14 also has adjustment notches 24 formed on its surface at the holes 17 and has two symmetrical hollows 25 with a circular arc-like profile; a corresponding anchoring element 26, suitable to simulate a bicycle pedal, is fixed to the support 13 at each one of said recesses so as to correspond, during use, to the region where the sole normally rests on the pedal.

Means simulating the bulk of the pedal cranks of the bicycle are also provided.

Each one of the anchoring elements 26 is fixed to the support 13 by means of a pivot 27 which is arranged at right angles to the direction along which the shoe 12 is positioned.

Each one of the anchoring elements 26 is ultimately interchangeably associated with the pivot 27, so that it is possible to provide a plurality of anchoring elements with various shapes and configurations so as to simulate the various kinds of pedal commercially available.

It is thus evident that the fixture 10, in this regard, has substantially no limitations, since it can be gradually updated in relation to new productions.

The means for simulating the bulk of the pedals, in this case, comprise a longitudinally-elongated plate-like element 28 of suitable width which is interchangeably fixed to pins 29, two of which are provided in this case; the pins protrude at right angles from the surface 14 and are arranged along the directrix of the axis of symmetry that is parallel to the axis of the shoe 12.

In particular, the fixture 10 can be provided with a plurality of plate-like elements 28 of different widths so as to simulate the various types and bulks of commercially available pedals.

The earlier considerations concerning the fact that the fixture 10 can in practice be updated substantially continuously with respect to new commercially available models of pedal apply in this case too.

In practice it has been observed that the present invention has achieved the intended aim and objects thereof.

It should in fact be noted that the fixture according to the present invention allows effective, functional and precise adjustment and positioning (allowing millimetric precision) with respect to the positioning of the cleats on the shoes in order to achieve optimum anchoring of the shoe to the pedal.

Attention is also drawn to the exceptional flexibility of the fixture according to the invention, which can also be updated in relation to new models of bicycle shoe, pedal and pedal crank.

Attention is also drawn to its extreme operating simplicity, since the fixture according to the invention allows, by means of the positioning and locking of the resting elements, to substantially provide supports having positional memory, which thus allow both to start from an "old" shoe with an already-established position of the cleat, in order to reproduce it in a new shoe, and to simply, quickly and efficiently achieve optimum positioning, avoiding continuous testing on the pedal and tests which can lead to the above mentioned tendon inflammations.

In addition, the simple structure of the fixture according to the invention allows to manufacture the fixture at a low cost which is accessible to any user.

Furthermore the fixture according to the invention allows adjustment substantially in all directions on the cleat movement plane.

The present invention is susceptible of numerous modifications and variations, all of which are within the scope of the inventive concept; likewise, the details may be replaced with other technically equivalent elements and the materials and the dimensions may be any according to requirements.

What is claimed is:

1. A fixture for positioning pedal anchoring cleats on soles of cycling shoes, comprising a support with at least two portions, a corresponding resting element being adjustably associated with each one of said portions, said resting element having at least two pins for a self-centering support of the edge of an end of a corresponding shoe, the other end being supported by an opposite support, a corresponding element which simulates a bicycle pedal being fixed to said support between said portions so as to correspond, during operation, to a region for the normal anchoring of the sole to the pedal, means for simulating the bulk of the corresponding pedal crank of the bicycle being provided.

2. A fixture according to claim 1, wherein each one of said portions has a hole which adjustably accommodates said resting element.

3. A fixture according to claim 2, comprising a support with a resting surface which has, at corresponding portions, two pairs of symmetrically arranged holes in each of which a corresponding resting element is adjustably associated, said resting element having at least two pins, which have a protruding end and whose axis is perpendicular to said surface, for the self-centering support of an end of a corresponding shoe, the other end being supported by the opposite resting element, said surface having adjustment notches on the face at the holes and two symmetrical recesses, at each whereof a corresponding contoured anchoring element, adapted to simulate a bicycle pedal, is fixed to said support so as to correspond, during use, to the region where the sole normally rests on the pedal, means being provided for simulating the space occupation of the pedal cranks of the bicycle.

4. A fixture according to claim 3, wherein said surface has adjustment notches on the face at the holes and corresponding locator notches on said resting elements.

5. A fixture according to claim 3, wherein said pins are conical.

6. A fixture according to claim 3, wherein each one of said anchoring elements is fixed to said support by means of a pivot which is arranged at right angles to the shoe positioning direction.

7. A fixture according to claim 6, wherein each one of said anchoring elements is interchangeably associated with said support.

8. A fixture according to claim 3, wherein each one of said resting elements comprises two flat disks which are axially associated with a common threaded element provided with a knob which is available for the user's action and has a smaller diameter than the corresponding hole, said flat disks being suitable to reversibly couple in a sandwich-like fashion to said surface, obtaining a support with positional memory, said at least two conical pins protruding from one of said flat disks which is directed upward during use.

9. A fixture according to claim 8, wherein three conical pins protrude from said flat disk and are arranged so that their axes lie substantially at the vertices of an imaginary triangle.

10. A fixture according to claim 1, wherein said means that simulate the bulk of the pedal cranks comprise a longitudinally-elongated plate-like element of adequate width which is interchangeably fixed to pivots which protrude at right angles from said surface and are arranged along the directrix of the axis of symmetry that is parallel to the axis of said shoe.

\* \* \* \* \*